Jan. 23, 1968  L. BOOD  3,365,178
APPARATUS FOR AGITATING AND AERATING
EXPOSED BODIES OF WATER
Filed Feb. 21, 1966
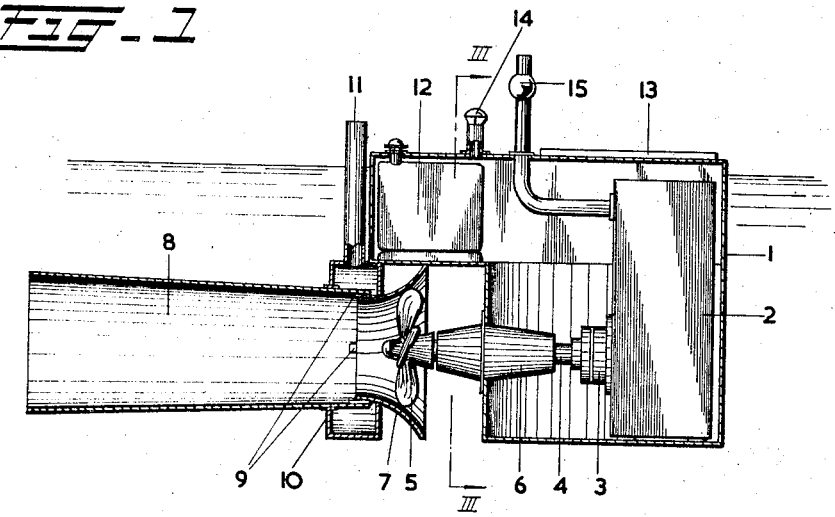
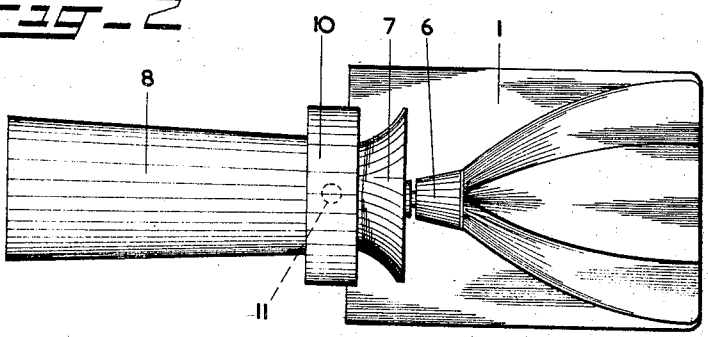
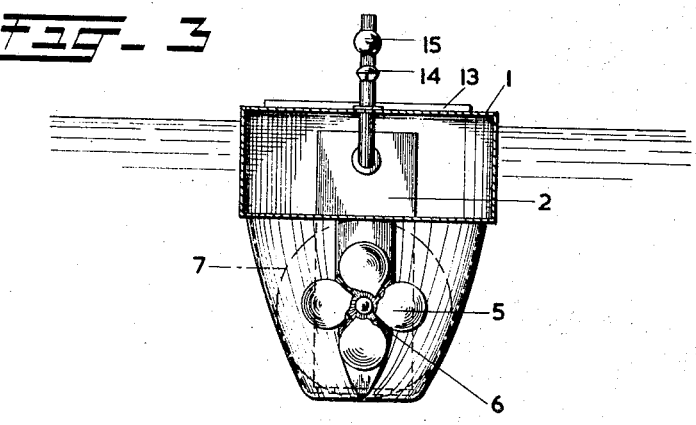
INVENTOR
LOURIS BOOD
BY Young & Thompson
ATTORNEYS

United States Patent Office 3,365,178
Patented Jan. 23, 1968

3,365,178
APPARATUS FOR AGITATING AND AERATING EXPOSED BODIES OF WATER
Louris Bood, Rodenrijs, Netherlands, assignor to Mowid Anstalt, Vaduz, Liechtenstein, a Swiss corporation
Filed Feb. 21, 1966, Ser. No. 528,978
Claims priority, application Switzerland, Feb. 26, 1965, 2,665/65
9 Claims. (Cl. 261—25)

ABSTRACT OF THE DISCLOSURE

Apparatus for agitating and aerating exposed bodies of water comprises a vessel that floats on the water and has a generally horizontally directed propeller outside the vessel. The vessel carries a motor to rotate the propeller. A pair of concentric conduits form an eductor downstream of the propeller, and air is brought through a conduit from the atmosphere down to the eductor, the stream of water with entrained small bubbles of air being discharged horizontally.

---

The present invention relates to apparatus for agitating and aerating exposed bodies of water such as canals, ponds, and the like.

Among the purposes of apparatus of this type are purification and odor abatement in stagnant or polluted water, and the supply of adequate oxygen to fish in winter when the surface of the water is covered with ice.

Apparatus to achieve this end is already known. It has been proposed to provide perforated hoses coupled to an air compressor, or to provide a pump which raises water and lets it fall back to the body of water. However, such known apparatus has various drawbacks. In the first place, it can be mounted only near the bank or in a ship, and a ship adapted for this use is not readily adaptable to other uses. In addition, the use of a perforated air hose is disadvantageous because it does not greatly agitate the water, and also because the resulting aeration is not very great. This latter is true because the time of contact of the air bubbles with the water is very short, and also because the air bubbles are relatively large and accordingly do not present a large interface with the water. Still further, the pumping apparatus referred to above is characterized by large power consumption.

Therefore, it is an object of the present invention to provide such apparatus which will be characterized by a high rate of water flow in combination with the provision of very finely divided air in admixture with the flowing water.

Another object of the present invention is the provision of such apparatus that will operate at a predetermined depth regardless of the depth of the body of water in which it is used.

Finally, it is an object of the present invention to provide such apparatus which will be relatively simple and inexpensive to manufacture, easy to operate, maintain and repair, and rugged and durable in use.

Other objects and advantages of the present invention will become apparent from a consideration of the following description, taken in connection with the accompanying drawing, in which:

FIG. 1 is a side elevational view, with parts in cross section, of apparatus according to the present invention;

FIG. 2 is a bottom plan view of the apparatus of FIG. 1; and

FIG. 3 is a side view in cross section, taken on the line III—III of FIG. 1 and looking in the direction of the arrows.

Referring now to the drawing in greater detail, there is shown apparatus according to the present invention, comprising a floating tank 1 containing a driving motor 2. Driving motor 2 may be of any type, such as an internal combustion engine or an electric motor. If an electric motor is used, it is not necessary to use a special completely closed motor, as is necessary for immersion pumps known heretofore. A reduction gearing and clutch unit 3 rotatably drives a drive shaft 4 which extends through a wall of tank 1. Shaft 4 carries at its end a propeller 5. In order to prevent jamming of propeller 5, it is desirable that propeller 5 be of the type which is not clogged by algae and the like, for example, a so-called algae-free propeller. Shaft 4 passes in water tight fashion through a sealing and bearing member 6 that is carried by and extends through the wall of tank 1. Member 6 may be of the conventional type as is used to guide the engine shaft through the hull of a motor boat and need not be described in greater detail.

The underside of tank 1 is streamlined in the same manner as the stern of a boat, as shown in FIG. 2. Anchor means (not shown) are secured to tank 1 so that it will not move about either in operation or at rest.

Tank 1 has a lateral projection that extends above propeller 5 and that carries a fuel tank 12 for supplying fuel to motor 2. This lateral projection also supports the fixed structure which cooperates with the propeller in a manner that will now be described:

This fixed structure comprises two members or conduits 7 and 8 which between them constitute a throat means that defines a flow passageway for air and water. In the embodiment shown, the direction toward the left in FIGS. 1 and 2 is the downstream direction; and member 7 converges in a downstream direction and completely encloses propeller 5. The bell of upstream end of member 7 is in direct contact with the water surrounding the floating tank.

Member 8 is elongated and concentric with member 7 and diverges in the illustrated embodiment in a downstream direction. The external diameter of member 7 at its downstream end is smaller than the internal diameter of member 8 at its upstream end, and the upstream end of member 8 surrounds and is concentric with and overlies the downstream end of member 7, so that a slot 9 is defined between the overlying ends of members 7 and 8.

This slot 9 is surrounded by an annular chamber 10 which completely surrounds and interconnects the members 7 and 8. Chamber 10 is also secured to the underside of the lateral extension of tank 1. An air duct or conduit 11 extends from chamber 10 to a point above the surface of the water and provides a passageway for air to chamber 10.

The top of tank 1 in the illustrated embodiment is closed to prevent the entry of water. One or more trap doors 13 make it possible to inspect and operate and maintain the motor 2. An air supply conduit 14 provides combustion air for the motor, and a vent 15 serves to discharge exhaust gases from the motor.

In operation, rotation of propeller 5 directs a rotating stream of water through members 7 and 8 in a downstream direction. The injector or eductor action of this stream of water, resulting from the kinetic energy of the water, draws air through the passageway provided by conduit 11 and in through slot 9, and the air becomes finely divided and entrained in the stream of water. The velocity of the water leaving member 8 is such that the finely divided air entrained in the water follows a relatively long path through the shallow water near the surface of the body of water, before rising to the surface. Accordingly, the aeration of the water passing through and surrounding the apparatus of the present invention is quite thorough and effective.

The optimum depth of immersion for operation of the present invention will depend on the construction and manner of operation of the apparatus. However, that optimum depth of immersion will thereafter be attained in any body of water, as the fact that the apparatus floats ensures that a given depth of immersion will be maintained.

It is also desirable to construct the apparatus in such a manner that it will be lightweight and portable.

Having described my invention, I claim:

1. Apparatus for agitating and aerating exposed bodies of water, comprising a vessel that floats on water, a generally horizontally directed propeller outside the vessel, a motor carried by the vessel for rotating the propeller to propel a stream of water generally horizontally, throat means encompassing said stream of water downstream from said propeller, and means defining an air passageway between the interior of the throat means downstream from said propeller and the atmosphere so that the kinetic energy of the stream of water draws air through said passageway and into the stream of water downstream from said propeller.

2. Apparatus as claimed in claim 1, said means defining an air passageway including means defining an annular chamber about said throat means.

3. Apparatus as claimed in claim 2, said throat means comprising a pair of coaxial annular members.

4. Apparatus as claimed in claim 3, said annular members having overlapping adjacent ends that define between them an annular slot that opens into the interior of the throat means in a downstream direction relative to said stream of water.

5. Apparatus as claimed in claim 1, said vessel having a lateral extension above said propeller, said throat means being carried by said lateral extension.

6. Apparatus as claimed in claim 5, said motor being an internal combustion engine, and a fuel tank for supplying fuel to said internal combustion engine, said fuel tank being disposed in said lateral extension above said propeller.

7. Apparatus for agitating and aerating exposed bodies of water, comprising a vessel that floats on water, a generally horizontally directed propeller outside the vessel, a motor carried by the vessel for rotating the propeller to propel a stream of water in a generally horizontal direction, eductor means comprising a pair of concentric conduits, the adjacent ends of the conduits overlapping and defining between them an annular slot that opens into the interior of the eductor means in a downstream direction relative to said stream of water, an annular chamber surrounding and interconnecting said conduits, an air duct communicating between the interior of said chamber and the atmosphere, said propeller being disposed in the upstream end of said eductor means, upstream from said slot, and being coaxial with said conduits whereby the kinetic energy of said stream of water draws air through said duct and into said chamber and through said slot and into said stream of water downstream from said propeller.

8. Apparatus as claimed in claim 7, said vessel having a lateral extension above said propeller, said annular chamber being carried by said lateral extension.

9. Apparatus as claimed in claim 8, said motor being an internal combustion engine, and a fuel tank for supplying fuel to said internal combustion engine, said fuel tank being disposed in said lateral extension above said propeller.

References Cited

UNITED STATES PATENTS

| | | | |
|---|---|---|---|
| 1,097,991 | 5/1914 | Sawyer | 261—93 |
| 2,244,902 | 6/1941 | Stich | 261—93 X |
| 2,280,979 | 4/1942 | Rocke | 261—93 |
| 2,293,183 | 8/1942 | Walker | 261—93 |
| 2,328,414 | 8/1943 | Beyer | 261—77 X |
| 2,852,239 | 9/1958 | Vicard | 261—24 |
| 3,067,435 | 12/1962 | Nash | 261—77 X |
| 3,108,146 | 10/1963 | Gross | 261—93 X |
| 3,123,652 | 3/1964 | Gross | 261—93 X |
| 3,189,334 | 6/1965 | Bell | 261—120 X |
| 3,206,176 | 9/1965 | Peterson | 261—93 X |

FOREIGN PATENTS

| | | |
|---|---|---|
| 703,863 | 2/1965 | Canada. |
| 174,687 | 3/1961 | Sweden. |

HARRY B. THORNTON, *Primary Examiner.*

TIM R. MILES, *Assistant Examiner.*